Nov. 7, 1933.  F. GRIFFITH ET AL  1,934,059
TRANSFER MECHANISM FOR BELT CONVEYERS
Filed March 26, 1930  3 Sheets-Sheet 1

Inventors
FRANCIS GRIFFITH
ELVIN R. VAN ARSDALE
By their Attorney
Eugene C. Brown

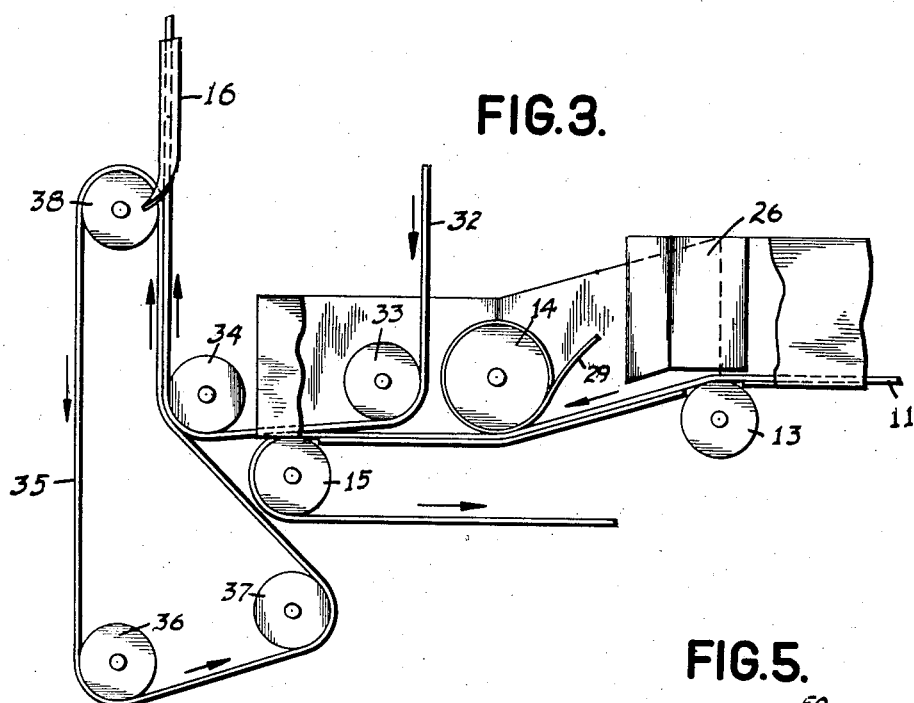
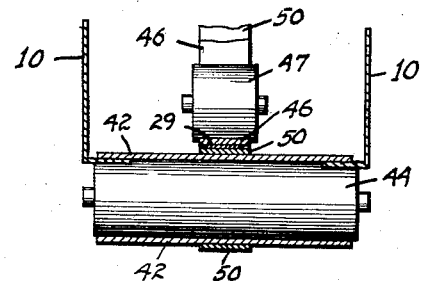
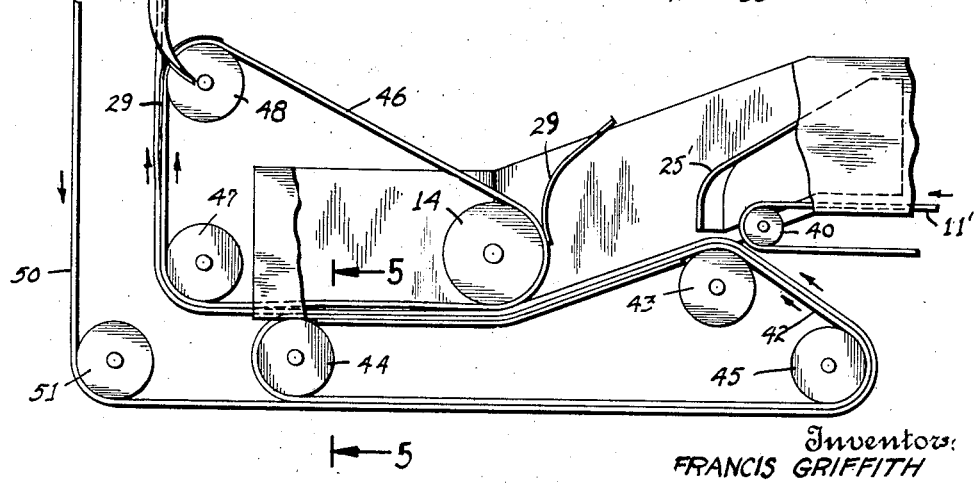

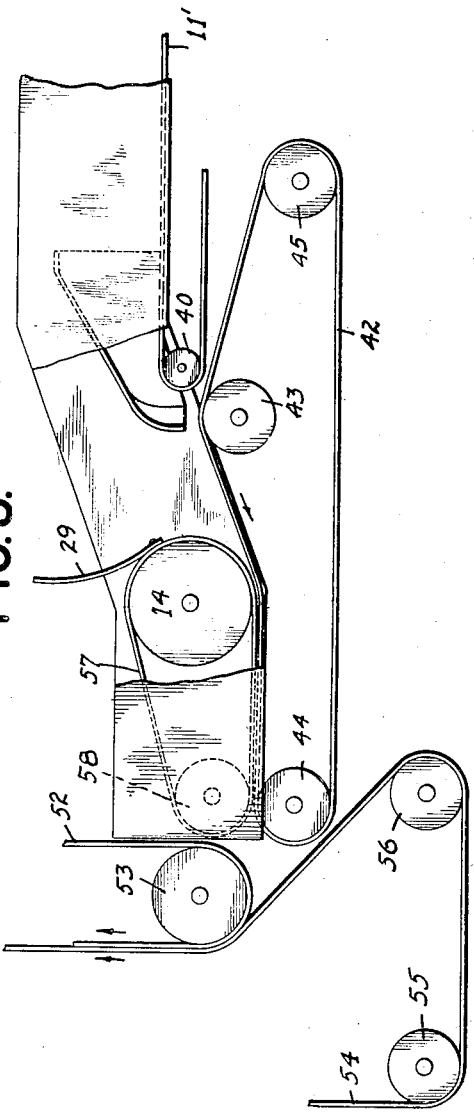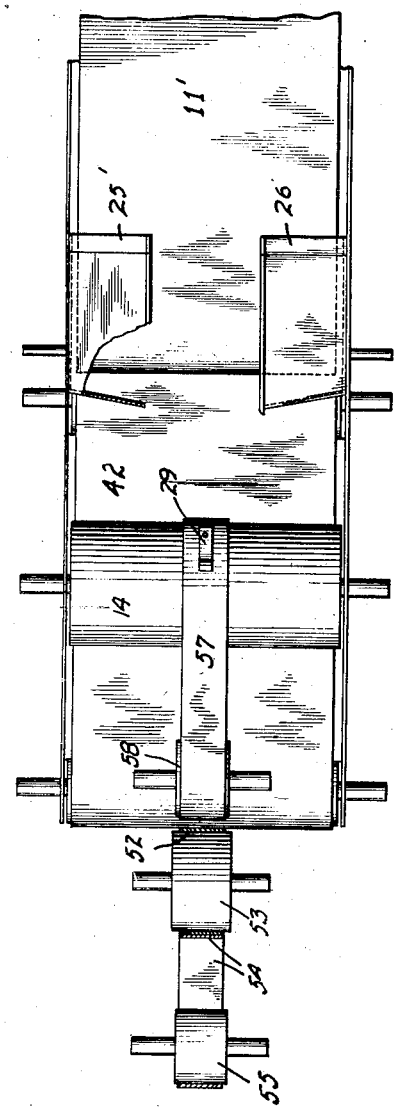

Patented Nov. 7, 1933

1,934,059

UNITED STATES PATENT OFFICE 1,934,059

TRANSFER MECHANISM FOR BELT CONVEYERS

Francis Griffith, Passaic, and Elvin R. Van Arsdale, Rutherford, N. J., assignors to The Western Union Telegraph Company, New York, N. Y., a corporation of New York Application March 26, 1930. Serial No. 439,123

12 Claims. (Cl. 198—165)

This invention relates to a conveyer for transporting flat articles such as letters, telegram blanks, and the like.

The conveyer system of a large telegraph office, may consist of a number of conveyers of different types, depending upon the service to be performed, the conveyers feeding into one another. For instance, for horizontal runs, particularly main feeder lines, flat horizontal belt conveyers are extensively employed in which the articles are conveyed upon a wide belt in a substantially horizontal position and where it is necessary to transport the articles vertically or up a sharp incline it is the practice to employ a conveyer in which the articles are carried between two conveyer elements as, for instance, between two narrow straps as in the system described in a co-pending application of B. Beardsley et al., Serial No. 406,655, filed November 12, 1929, and entitled "Strap conveyer system", or between a single strap and a guide channel as in the system described in a co-pending application of F. E. d'Humy et al., Serial No. 422,126 filed January 20, 1930, now Patent No. 1,793,935 and entitled "Drag conveyer."

However, when attempts are made to transfer the sheet articles directly from a flat horizontal belt conveyer into a conveyer of one of the above types, difficulty is experienced due to the fact that the articles do not discharge from the flat belt conveyer in any uniform position but may be conveyed along the wide belt conveyer and discharged therefrom in nearly every conceivable position. For instance, due to deflecting air currents and other causes the flat articles shift around upon the conveyer and may ride up the side walls thereof and thus travel along the conveyer adjacent either side thereof in a vertical or inclined position.

It is one of the objects of the present invention therefor, to provide a horizontal flat belt conveyer in which the articles will be discharged therefrom with substantial uniformity of position.

Another object is to provide means for transferring sheet articles from a horizontal flat belt conveyer into a conveyer of another type such as a double strap or drag conveyer.

Another object is to provide a flat belt conveyer having associated therewith means for centering the articles being conveyed therein and for positioning the same horizontally on the conveyer belt.

Other objects and advantages will hereinafter appear.

In accordance with the present invention the flat horizontal belt conveyer, adjacent its discharge end is provided with deflecting members extending from each side thereof towards the center, cooperating with a downwardly inclined portion of the conveyer for deflecting the articles being conveyed towards the center of the belt. Beyond the deflecting members an idler roller is provided having means, acting upon the rotation thereof, for striking the articles sharply and forcing them down horizontally onto the belt beneath the deflecting members. The articles pass between a belt travelling at the idler roller and the wide belt and are discharged from the conveyer in a horizontal position, substantially central of the belt.

In order that the invention may be more fully understood reference will be had to the accompanying drawings in which:

Figure 3 is a side elevation of a modified form of flat belt conveyer discharging into a trough conveyer;

Figure 4 is a side elevation of another modification for discharging articles from a horizontal belt conveyer into a trough conveyer;

Figure 5 is a sectional view of the line 5—5 of Figure 4;

Figure 6 is a side elevation of a still further modification in which the articles are discharged from the horizontal belt conveyer into a conveyer of the double strap type; and Figure 7 is a plan view of the construction shown in Figure 6.

Figure 1:
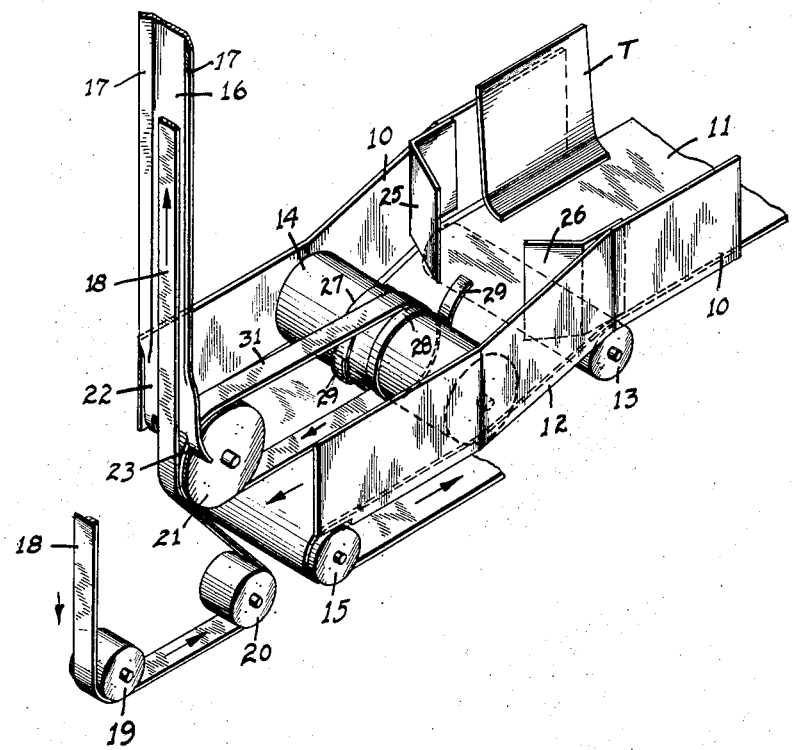
Figure 1 is a perspective view of the discharge end of a horizontal belt conveyer embodying the present invention and having associated therewith a drag conveyer into which the articles being conveyed are transferred.

Referring first to the modification shown in Figure 1, the terminal or discharge end of the horizontal flat belt conveyer is shown as comprising a wide trough having vertical side walls 10 and a belt 11 having its operating run supported upon the base of the trough so as to travel therein. Slightly in advance of the end of the conveyer, the trough slopes sharply downward as at 12, the belt passing over a roller 13 and under an idler roller 14, and thence horizontally to the end of the conveyer and around the end roller 15, returning substantially parallel to the operating run. The belt 11 is of a width at least equal to the greatest dimension of the sheet articles to be conveyed.

Disposed adjacent the end of the horizontal belt conveyer, a portion of a second conveyer of the drag type is shown positioned so as to receive the articles from the belt 11 and continue their transportation in a vertical direction.

The drag conveyer comprises a stationary trough 16 having outwardly diverging side flanges 17. A narrow belt 18 passes around rollers 19 and 20 and over a roller 21 into contact with the trough, so as to convey sheet material along the trough beneath the belt. The side flanges 17 of the trough are flattened into the plane of the base of the trough adjacent the lower end thereof, as indicated at 22, and the side flanges are extended beyond the base and curved along the sides of the roller 21, as shown at 23. The articles are delivered from the horizontal belt conveyer into contact with the belt 18 of the drag conveyer, in advance of the roller 21, and are carried around the roller and into the trough between the belt 18 and the stationary trough.

In order that the articles will be properly conveyed along the drag conveyer, they should be fed into the conveyer at the roller 21 in a substantially flat or horizontal position, and substantially centrally of the drag conveyer. For this purpose the horizontal belt conveyer is provided with means for positioning the articles upon the belt 11 so that they will be properly delivered into the inlet of the drag conveyer.

A pair of deflecting plates 25 and 26 extend inwardly and forwardly from the vertical sides 10 of the horizontal conveyer adjacent the upper part of the inclined portion 12, and the lower edges of the deflecting plates are disposed substantially parallel to and slightly above the inclined portion of the belt and below the level of the upper or main portion of the horizontal belt 11. The plates 25 and 26 serve to deflect the articles traveling along the edges of the belt towards the center thereof.

The idler roller 14 near its center portion, is provided with two straps 27 and 28 each having a flap 29 arranged so as to be thrown outwardly by centrifugal force between the deflecting plates 25 and 26 as the roller revolves. The flaps 29 are provided on diametrically opposite sides of roller 14, and serve to engage any articles held between the deflecting plates 25 and 26 so as to depress them beneath the lower edges of the deflecting plates and draw them beneath the roller 14. A narrow endless strap 31 extends between the rollers 14 and 21 so as to hold the articles in position upon the belt 11, between the roller 14 and the end of the conveyer.

Figure 2:
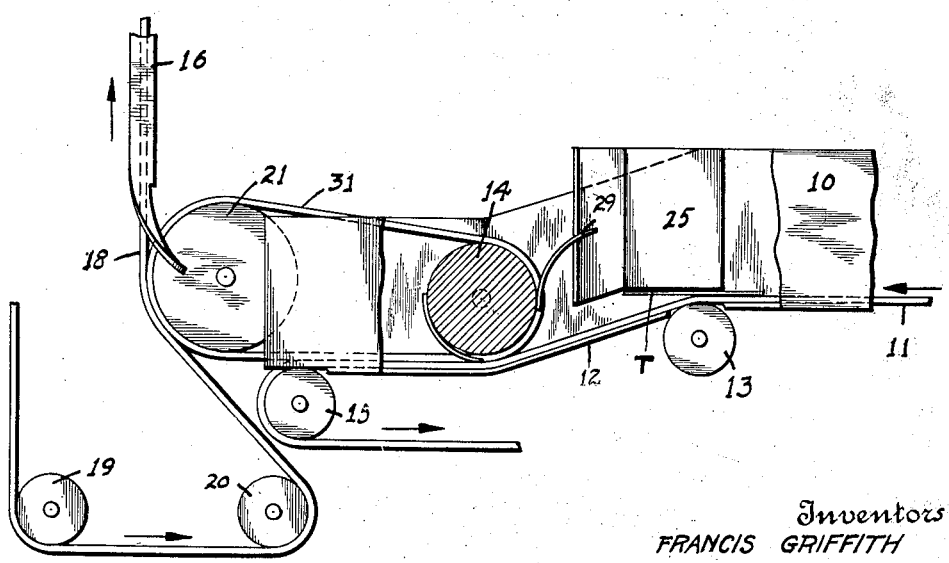
Figure 2 is a side elevation of the conveyer shown in Figure 1.

The horizontal belt conveyer may be of any desired length, as for instance, several hundred feet in length, and the articles to be conveyed therealong are deposited upon the belt 11 substantially horizontally, but as stated before, during the course of travel they may assume various positions upon the belt, and in Figure 1, we have indicated a telegraph blank T being conveyed along the belt adjacent one side wall in a substantially vertical position. Upon engagement of such a blank with the deflecting plate 25, it is thrown towards the center of the belt 11 between the two deflecting plates in such position as to be engaged by one of the straps 29 and thereby positioned horizontally on the belt 11 and carried beneath the lower edges of the deflecting plates and under the roller 14. Similarly, if the articles T are traveling horizontally along one edge of the belt, as shown in Figure 2, they engage the lower edge of the deflecting plate which extends downwardly below the level of the horizontal belt and are thus thrown towards the center of the belt so as to be engaged by one of the flaps 29. The articles are thus delivered between the straps 31 and 11 into contact with strap 18 of the drag conveyer substantially centrally thereof and in a horizontal position.

In Figure 3, we have shown a different arrangement in which the trough 16 terminates above the horizontal belt conveyer, the narrow belt 32 which travels in the trough, passing around the rollers 33 and 34 so as to travel substantially in contact with the belt 11 from the idler roller 14 to the end of the flat belt conveyer. The belt 32 engages the articles as they emerge from beneath the roller 14 and holds them in position upon the belt 11 until they are delivered therefrom. An endless belt 35 passes around the rollers 36, 37 and 34 and thence upwardly in contact with the belt 32 and around a roller 38. The articles, as they are delivered from the belt 11, are engaged between the belts 35 and 32 and conveyed upwardly to the trough 16, and thence into the trough 16 beneath the belt 32.

In Figure 4 the main belt 11' of the horizontal conveyer terminates at a roller 40 adjacent the upper end of the inclined portion of the trough, and a wide endless belt 42 extends from the roller 40 to the end of the flat belt conveyer, passing around the rollers 43, 44 and 45 and beneath the idler roller 14. This construction enables a sudden drop to occur in the horizontal belt conveyer at the roller 40, and the deflecting plates 25' and 26' are curved so as to extend vertically downward below the level of the upper run of the belt 11', thereby insuring that all articles being conveyed along the belt 11' will engage the downwardly extending portion of the deflecting plates. The arrangement of the deflecting plates is shown in plan in Figure 7.

An endless belt 46, passing around the rollers 47, 48 and 14, is provided with flaps 29 for engaging the articles lodged between the deflecting plates, so as to depress them below the lower edge of the deflecting plates and to draw them beneath the roller 14. The narrow belt 50, which travels in the trough 16, passes around a roller 51, thence around the rollers 45 and 43, and beneath the roller 14 in contact with the belt 42 and thence around the roller 47 to the inlet end of the trough 16 in contact with belt 46. The articles engaged by the flaps 29 are conveyed between the belts 46 and 50 to the lower end of the trough 16 and thence into the trough beneath the belt 50.

In Figure 6 the horizontal belt conveyer is shown discharging into a conveyer of the double strap type comprising a strap 52 passing downwardly around a roller 53 and then vertically upward, and a strap 54 passing around rollers 55 and 56, and thence vertically upward into contact with strap 52. The flaps 29 are secured to an endless belt 57 passing around the roller 14 and a roller 58.

It is obvious that various other modifications and changes may be made in the construction of the terminal without departing from the invention, and we do not desire to be limited to the particular forms shown and described, except in accordance with the appended claims.

What is claimed is:

1. A conveyer for sheet material comprising a belt of a width at least equal to the width of said material, upon which said material is conveyed, a deflecting member extending inwardly from each side of said conveyer for directing said material towards the center of the conveyer, and means for engaging said material between said deflecting members to force the same beneath said members.

2. A conveyer for sheet material comprising a belt of a width at least equal to the width of said material, upon which said material is conveyed, a deflecting member extending inwardly from each side of said conveyer and spaced above the surface of the conveyer for directing said material towards the center of the conveyer and periodically operating means engaging the material between said deflecting members to force the same there beneath whereby it may be conveyed along said conveyer.

3. A conveyer for sheet material comprising a belt of a width at least equal to the width of said material, upon which said material is conveyed, a deflecting member extending inwardly from each side of said conveyer and spaced above the surface of the conveyer for directing said material towards the center thereof, an idler roller in contact with said belt in advance of said deflecting members and a striker member associated with the idler roller for engaging said material between the deflecting members to force the material against said belt and to draw the same past said deflecting members.

4. A conveyer for sheet material comprising a belt of a width at least equal to the width of said material, upon which said material is conveyed, a deflecting member extending inwardly from each side of said conveyer and spaced above the surface of the conveyer for directing said material towards the center thereof, an idler roller in contact with said belt in advance of said deflecting members, a striker member associated with said idler roller for engaging said material between the deflecting members to force the material against said belt and to draw the same past said deflecting members, and a second conveyer having two conveyer elements adapted to convey sheet material there between, said second conveyer being disposed relative to said belt so as to receive said sheet material therefrom.

5. A conveyer for sheet material comprising a belt of a width at least equal to the longest dimension of said material, upon which said sheet material is conveyed, said conveyer having a horizontal portion and a portion inclined downwardly therefrom in the direction of travel of the conveyer, deflecting members disposed above said inclined portion adjacent the horizontal portion of the conveyer, said deflecting members extending inwardly from each side of the conveyer and downwardly below the plane of the horizontal portion of the conveyer for directing said material being conveyed towards the center of said conveyer, and an idler roller disposed at the lower end of said inclined portion, said idler roller having a striker member associated therewith for engaging said sheet material between the deflecting members and forcing it beneath said members.

6. A conveyer for sheet material comprising a belt of a width at least equal to the longest dimension of said material, upon which said sheet material is conveyed, said conveyer having a horizontal portion and a portion inclined downwardly therefrom in the direction of travel of the conveyer, a deflecting member disposed above said inclined portion adjacent the horizontal portion of the conveyer and extending inwardly from each side of the conveyer and downwardly below the plane of the horizontal portion of the conveyer, for directing said material being conveyed towards the center of said conveyer, and an idler roller disposed at the lower end of said inclined portion, said idler roller having a centrifugally operated strap member associated therewith for periodically engaging said sheet material between said deflecting members and forcing it beneath said members.

7. A conveyer for sheet material comprising a belt of a width at least equal to the longest dimension of said material upon which said sheet material is conveyed, said conveyer having a horizontal portion and a portion inclined downwardly therefrom in the direction of travel of the conveyer, a deflecting member disposed above said inclined portion adjacent the horizontal portion of the conveyer, and extending inwardly from each side of the conveyer and downwardly below the plane of the horizontal portion of the conveyer for directing said material being conveyed towards the center of said conveyer, an idler roller disposed at the lower end of said inclined portion, an auxiliary belt extending from said idler roller along said conveyer in contact with said main belt, and means for engaging said sheet material between said deflecting members directing it between said main and auxiliary belts.

8. A conveyer for sheet material comprising a main horizontal belt of a width at least equal to the width of the material being conveyed and upon which said sheet material is conveyed in a horizontal position, an idler roller disposed above said belt, an auxiliary belt extending from said idler roller along said conveyer in contact with said main belt, and a strap having one end secured to said auxiliary belt and the opposite end free to move outwardly from said belt by centrifugal force to engage said sheet material in advance of said idler roller and draw it between said main and auxiliary belts.

9. A conveyer for sheet material comprising a substantially horizontal belt upon which said material is conveyed, a second belt disposed below the discharge end of said first belt, a deflector positioned at the end of said first belt and extending downwardly below the level of said belt and spaced above said second belt, for engaging said sheet material and directing it towards the center of the conveyer, and downwardly striking means engaging said sheet material and forcing it beneath said deflecting member horizontally on to said second belt.

10. A conveyer for sheet material comprising a substantially horizontal belt upon which said material is conveyed, a second belt disposed below the discharge end of said first belt and inclined downwardly therefrom, a deflector positioned at the end of said first belt and extending downwardly below the level of said belt and spaced above said second belt for engaging said sheet material and directing it towards the center of the conveyer, and an idler roller disposed above said second belt having a downwardly striking strap member associated therewith adapted to engage said sheet material and force it beneath said deflecting members onto said second belt.

11. A conveyer for sheet material comprising a substantially horizontal belt upon which said material is conveyed, a second belt disposed below the discharge end of said first belt and inclined downwardly therefrom, a deflector positioned at the end of said first belt and extending downwardly below the level of said belt and spaced above said second belt for engaging said sheet material and directing it towards the center of the conveyer, an idler roller disposed above said second belt having a downwardly striking strap member associated therewith adapted to engage said sheet material and force it beneath deflecting members onto said second belt, and an auxiliary belt passing around said idler roller and extending along said conveyer in contact with said second belt to grip the material and maintain the same horizontally of said conveyer substantially centrally thereof.

12. A conveyer for sheet material comprising a substantially horizontal belt upon which said material is conveyed, a second belt disposed below the discharge end of said first belt and inclined downwardly therefrom, a deflector positioned at the end of said first belt and extending downwardly below the level thereof and spaced above said second belt, for engaging said sheet material and directing it towards the center of the conveyer, an idler roller disposed above said second belt having a downwardly striking strap member associated therewith adapted to engage said sheet material and force it beneath said deflecting members onto said second belt, an auxiliary belt passing around said idler roller and extending along said conveyer in contact with said second belt to grip the material and maintain the same horizontally thereon and substantially centrally thereof, and a second conveyer having two conveyer elements adapted to transport said sheet material therebetween, the second conveyer being disposed at the end of said first conveyer to receive said sheet material therefrom.

FRANCIS GRIFFITH.
ELVIN R. VAN ARSDALE.